（12） United States Patent
Peussa

(10) Patent No.: US 9,109,603 B2
(45) Date of Patent: Aug. 18, 2015

(54) MULTI-STAGE CENTRIFUGAL COMPRESSORS

(75) Inventor: Jouko Tapani Peussa, Sint-Stevens-Woluwe (BE)

(73) Assignee: GARDNER DENVER DEUTSCHLAND GMBH, Bad Neustadt (DE)

( * ) Notice: Subject to any disclaimer, the term of this patent is extended or adjusted under 35 U.S.C. 154(b) by 271 days.

(21) Appl. No.: 13/145,171

(22) PCT Filed: Dec. 23, 2009

(86) PCT No.: PCT/EP2009/009284
§ 371 (c)(1),
(2), (4) Date: Dec. 12, 2011

(87) PCT Pub. No.: WO2010/086009
PCT Pub. Date: Aug. 5, 2010

(65) Prior Publication Data
US 2012/0087810 A1    Apr. 12, 2012

(30) Foreign Application Priority Data

Jan. 30, 2009 (GB) .................................. 0901576.9

(51) Int. Cl.
*F04B 35/00* (2006.01)
*F04B 41/00* (2006.01)
(Continued)

(52) U.S. Cl.
CPC ............... *F04D 17/12* (2013.01); *F04D 25/06* (2013.01); *F04D 27/0269* (2013.01); *F04D 29/5833* (2013.01)

(58) Field of Classification Search
CPC ..... F04D 17/12; F04D 29/5833; F04D 25/06; F04D 27/0269

USPC .................... 417/5, 243, 244, 247, 248
See application file for complete search history.

(56) References Cited

U.S. PATENT DOCUMENTS 1,523,698 A * 1/1925 Losel ............................ 415/145
3,715,887 A    2/1973 Byrne
(Continued)

FOREIGN PATENT DOCUMENTS

CN     1444703 A    9/2003
EP     1 217 219    11/2001
(Continued)

OTHER PUBLICATIONS

PCT Notification of Transmittal of the International Search Report and the Written Opinion of the International Searching Authority, or the Declaration mailed Mar. 31, 2010 (16 pages).
(Continued)

*Primary Examiner* — Peter J Bertheaud
*Assistant Examiner* — Dominick L Plakkoottam
(74) *Attorney, Agent, or Firm* — Michael Best & Friedrich LLP

(57) ABSTRACT

The invention relates to an improved multi-stage centrifugal compressor (10) comprising at least four centrifugal compression stages (11,12,13,14), each including an impeller. The impellers of one pair of the stages (12,13) are mounted on a first shaft (23) coupled to a first high speed direct drive motor (16), and the impellers of another pair of the stages (11,14) are mounted on a second shaft (24) coupled to a second high speed direct drive motor (15). The speed of the first and second motors is controlled by at least one drive (25) such that the impellers are all driven at the same speed.

7 Claims, 2 Drawing Sheets

(51) Int. Cl.
*F04D 17/12* (2006.01)
*F04D 25/06* (2006.01)
*F04D 27/02* (2006.01)
*F04D 29/58* (2006.01)

(56) References Cited

U.S. PATENT DOCUMENTS

| | | | |
|---|---|---|---|
| 4,219,306 A | | 8/1980 | Fujino et al. |
| 4,835,979 A | * | 6/1989 | Murry et al. ............... 62/172 |
| 5,611,663 A | * | 3/1997 | Kotzur ..................... 415/122.1 |
| 5,743,714 A | * | 4/1998 | Drob ............................... 417/2 |
| 5,980,218 A | * | 11/1999 | Takahashi et al. ............ 417/243 |
| 6,397,621 B1 | | 6/2002 | Reynaud |
| 6,402,482 B1 | | 6/2002 | Lee |
| 6,579,078 B2 | * | 6/2003 | Hill et al. .................. 417/423.7 |
| 7,044,716 B2 | * | 5/2006 | Fabry ............................ 417/243 |
| 8,376,718 B2 | * | 2/2013 | Baker et al. .................. 417/243 |
| 2002/0037225 A1 | | 3/2002 | Choi et al. |
| 2003/0175128 A1 | | 9/2003 | Fabry |
| 2004/0179947 A1 | | 9/2004 | Agrawal et al. |
| 2005/0188696 A1 | * | 9/2005 | Herz et al. ..................... 60/612 |
| 2007/0065300 A1 | * | 3/2007 | Mariani et al. ............... 417/243 |
| 2007/0189905 A1 | * | 8/2007 | Dinsdale et al. ................. 417/2 |
| 2009/0159528 A1 | * | 6/2009 | Bjerkreim et al. ............ 210/513 |

FOREIGN PATENT DOCUMENTS

| | | |
|---|---|---|
| EP | 1 626 179 A2 | 7/2005 |
| EP | WO 2005/068847 A1 | 7/2005 |
| GB | 202295 A | 6/1924 |
| GB | 714765 A | 9/1954 |
| GB | 992 651 A | 5/1965 |
| GB | 992651 A | 5/1965 |
| GB | 1367724 A | 9/1974 |
| GB | 2018893 A | 10/1979 |
| GB | 2 024 328 | 1/1980 |
| GB | 1 570 150 | 6/1980 |
| JP | S27-1483 | 4/1952 |
| JP | 48-75952 | 10/1973 |
| JP | 53-54306 | 5/1978 |
| JP | 63-36691 | 3/1988 |
| KR | 100861000 * | 9/2008 |
| KR | 100861000 B1 | 9/2008 |
| WO | WO 2011/017783 A2 | 2/2011 |

OTHER PUBLICATIONS

PCT Notification of Transmittal of the International Preliminary Report on Patentability mailed May 9, 2011 (10 pages).
Intellectual Property Office Examination Report under Section 18(3) for parent Application No. GB0901576.9 dated Jan. 20, 2011 (1 page).
Search Report dated May 14, 2009 for parent GB0901576.9 (1 page).
Opposition to companion EP Patent 2384399 filed by Atlas Copco Airpower N.V., 21 pages, dated Dec. 18, 2013.
Summary of Office Action Issued in companion Chinese Patent Application 200980155578.1, issued Jan. 26, 2014, 1 page.
Japanese Office Action of companion case 2011-546616.
International Preliminary Report on Patentability regarding PCT/ BE 2010/000054.
International Preliminary Report on Patentability regarding PCT/ BE2010/000054, mailed Feb. 23, 2012 (5 pgs).
Japanese Office Action for companion case JP 2011-546616, dated Jun. 11, 2014 (2 pages).

\* cited by examiner

MULTI-STAGE CENTRIFUGAL COMPRESSORS

The invention relates to improvements in multi-stage centrifugal compressors and, in particular, to an improved multi-stage centrifugal compressor.

Variable speed dynamic compressors, such as centrifugal compressors, have been used to compress air, or other gases, since the 1960s. Centrifugal compressors, which comprise a cylindrical assembly of compressor blades mounted to an axis to form the impeller, are used in a wide variety of fields for a number of reasons. They are generally energy efficient, are low maintenance as they have few moving parts, and they usually give a higher air flow than a similarly sized reciprocating compressor. The main disadvantage of centrifugal compressors is that they generally cannot achieve the high compression ratios of reciprocating compressors without multiple stages, although multi-stage centrifugal compressors can achieve significant discharge pressures.

The performance of a centrifugal compressor is expressed in terms of impeller speed, total head and required volumetric flow. In centrifugal compressors the pressure ratio, which is the ratio of the air pressure exiting the compressor to the air pressure entering the compressor, is proportional to the impeller speed. The stage efficiency correlates with the specific speed which is defined as the speed of an ideal compressor geometrically similar to the actual compressor which, when running at this speed will raise a unit of volume, in a unit of time through a unit of head. Specific speed ($N_s$) can be calculated from the following formula:—

$$N_s = \frac{N * \sqrt{Q}}{H^{0.75}}$$

wherein:
N=the rotational speed of the impeller (rpm)
Q=the volumetric flow (l/m)
H=the total dynamic head (m)

FIG. 1 shows a plot of efficiency against specific speed for a range of centrifugal compressors indicating that there is an optimum specific speed, with efficiency falling off at high and low specific speeds.

Prior art centrifugal compressors used in industrial air applications are typically two or three stage compressors. In order to achieve the required pressure ratio, the overall efficiency can be improved with intercooling between the stages since the specific work (w), i.e. the work per unit mass flow, per stage can be calculated by the following formula:—

$$w = R_1 * T_1 \frac{(n)}{(n-1)} * (Pr^{(n-1)/n} - 1)$$

wherein:
$R_1$=specific heat of the gas at a constant pressure (J/kg.K)
$T_1$=inlet temperature (K)
n=the ratio of the specific heat of the gas at the constant pressure and the specific heat of the gas at a constant volume
Pr=pressure ratio Ignoring small changes in the specific heat ($R_1$), it can be shown that the overall specific work (w) is smaller for compression in two stages with cooling back to near to the inlet temperature ($T_1$) at the second stage inlet, than for compression in a single stage. Similarly, the specific work (w) for three stage compression with intercooling is smaller than for two stage compression.

As air or gas is compressed in each stage, the volumetric flow (Q) will reduce in proportion to the stage pressure ratio (Pr). If the head rise is split evenly across the stages, then the specific speed ($N_{s2}$) of the second stage will be smaller than the specific speed ($N_{s1}$) of the first stage. Similarly, the specific speed of the third stage ($N_{s3}$) will be smaller than the specific speed ($N_{s2}$) of the second stage. Typically, the second stage specific speed ($N_{s2}$) will be in the range of high stage efficiencies as the range of specific speeds with good efficiency is sufficiently broad in this range of compressors. It is possible that the efficiency of the third stage is less than optimum if the specific speed is sufficiently low (see FIG. 1).

Prior art three stage centrifugal compressors often have the first and second stage impellers on one shaft and the third stage impeller on a second shaft. A gearbox is arranged to drive each shaft at, or near, the optimum speed. An example of such an arrangement is described in U.S. Pat. No. 6,488,467.

More recently, however, direct drives have been employed in centrifugal compressors, for example as described in EP-A-1319132 and EP-A-1217219. Gearboxes are not used in direct drive compressors and so the speed of each stage can be optimised by using individual motors and drives as shown, for example, in US-A-20070189905. The disadvantage of such systems is that individual motors and drives are expensive and require complex control systems to control the multiple motors/drives.

It is therefore an object of the present invention to provide an improved multi-stage compressor which has an improved efficiency.

The invention therefore comprises a multi-stage compression system comprising at least four centrifugal compression stages, each including an impeller, in which the impellers of one pair of the stages are mounted on a first shaft coupled to a first high speed direct drive motor, and the impellers of another pair of the stages are mounted on a second shaft coupled to a second high speed direct drive motor, the speed of the first and second motors being controlled by at least one drive such that the impellers are all driven at the same speed.

This arrangement has the advantage that the compression system can be simplified in terms of number of drives without compromising on stage efficiencies.

The invention will now be described, by way of example only, with reference to the accompanying drawings in which:—

Figure 1:
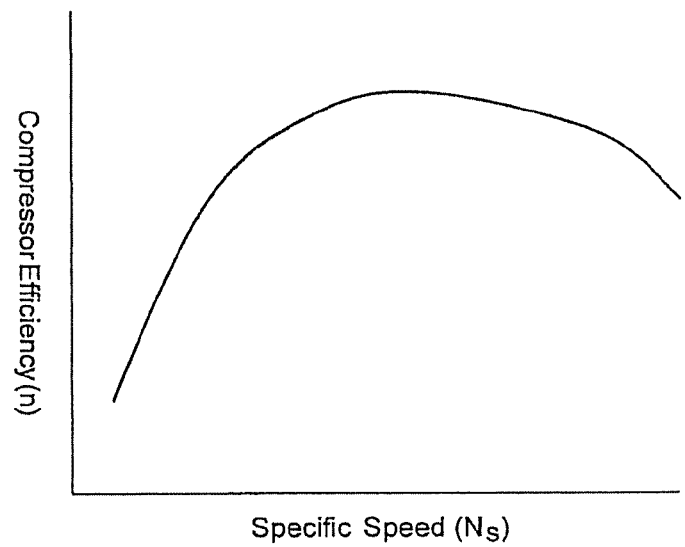
FIG. 1 is a graph showing the efficiency of a centrifugal compressor versus specific speed.
Figure 2:
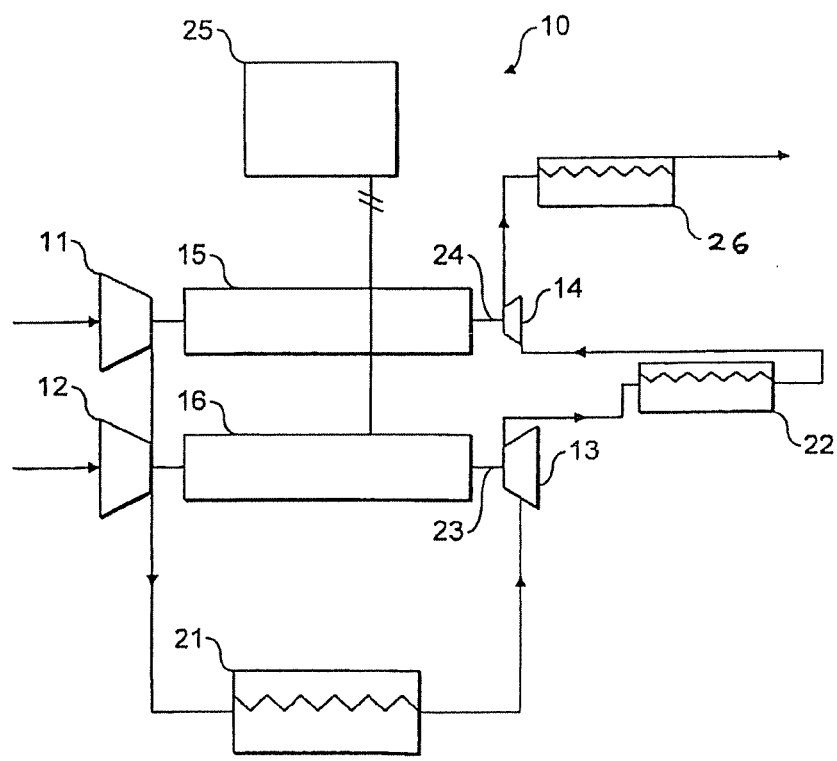
FIG. 2 is a schematic representation of one embodiment of the invention.

As shown in FIG. 2, a three stage centrifugal compressor 10 comprises two first stages 11,12 mounted in parallel to each other, and a second stage 13 and a third stage 14 each connected in series. Thus the fluid to be compressed is split equally across the fluid inlets to the two first stages 11, 12 and is compressed simultaneously. The fluid discharged at the fluid outlets of the two first stages 11,12 is then recombined before passing to the fluid inlet of the second and then the third stage. The stages 11/12,13,14 are driven by a pair of direct drive high speed motors 15/16.

The four impellers are mounted on two shafts 23,24 which are driven by the two high speed direct drive motors 15,16. The impeller of the second stage 13 is mounted on the same drive shaft 23 as the impeller of one of the first stages 12. The impeller of the third stage 14 is mounted on the same shaft 24 as impeller of the other first stage 11. The speed of the motors 15,16 is controlled by a single variable frequency or other drive or controller 25 and hence all four impellers are driven at the same speed. More than one drive 25 or controller may be utilised in which case all four impellers will still be driven at the same speed.

The fluid to be compressed is drawn into the impellers of the two parallel first stages 11,12. The compressed fluid streams discharged from the two first stages 11,12 are passed through an intercooler 21 and combined before being drawn into the impeller of the second stage 13. The fluid discharged from the second stage 13 is passed through a second intercooler 22 before being drawn into the impeller of the third stage 14. The fluid discharged from the third stage 14 is finally passed through after cooler 26 before being discharged for use. The two first compressed stage fluid streams may be combined before or after passing through the first intercooler (21).

This configuration with the splitting of the first stage 11/12 has the advantage that the cost, complexity and probability of mal-operation associated with additional drives and motors are all greatly reduced. The efficiency of each stage 11/12,13, 14 can be run near optimum as the specific speed range over the three stages 11/12,13,14 is relatively small.

For example, if the overall pressure ratio (Pr) is 8, and with equal pressure rise across each stage 11/12,13,14, the specific speed ($N_{s1}$) of each of the first stages 11,12 will be proportional to $\sqrt{(Q/2)}$, where Q is the total volumetric flow through the compressor at inlet and each first stage 11,12 compresses 50% of the flow. The specific speed ($N_{s2}$) of the second stage 13 will be proportional to $\sqrt{(Q/2)}$ and the specific speed ($N_{s3}$) of the third stage 14 will be proportional to $(Q/4)^{0.5}$.

Figure 3:
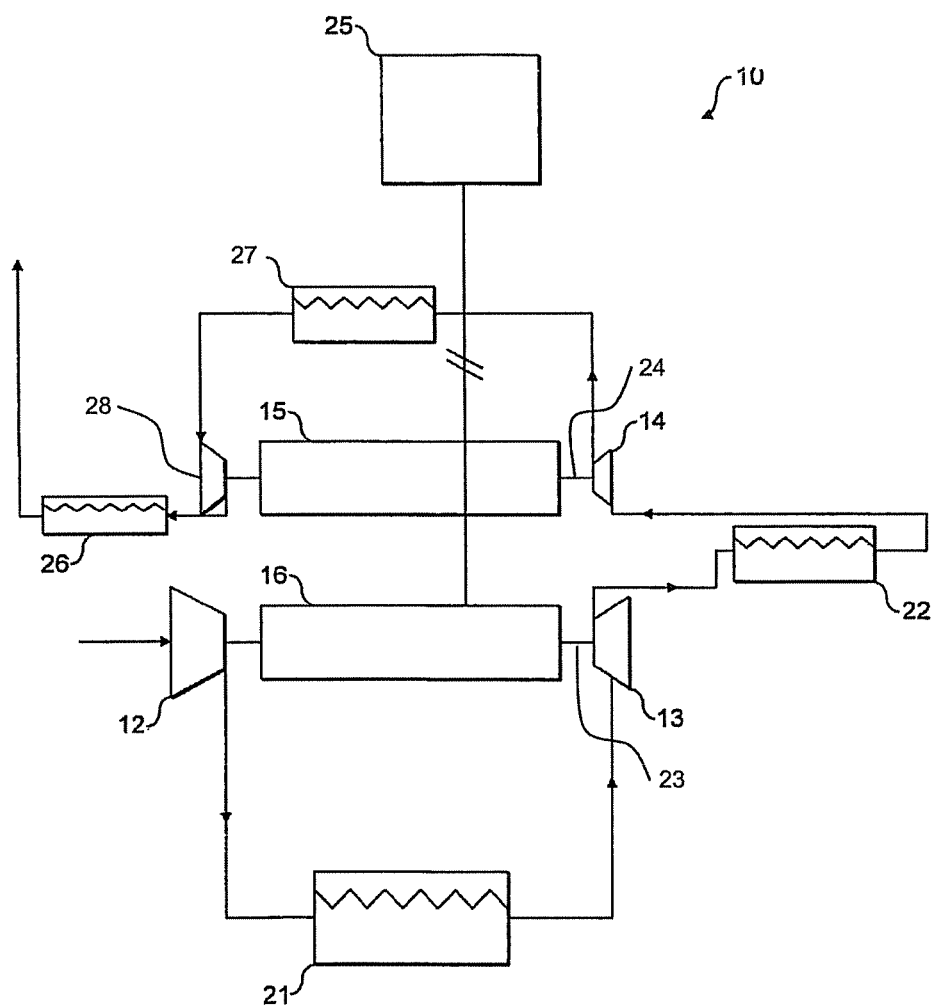
FIG. 3 is a schematic representation of another embodiment of the invention.

In an alternative embodiment of the present invention, a fourth stage is added, which enables the compressor 10 to achieve higher pressures than the previously described embodiment. As shown in FIG. 3 there is only a single first stage 12 and a third intercooler 27 is located between the third stage 14 and the fourth stage 28. The additional intercooler 27 helps to optimise the thermodynamic compression efficiency by maintaining low temperatures at the inlet to the fourth stage 28.

In this arrangement, the impellers of the first and second stages 12,13 are mounted on a first shaft 23 and the impellers of the third and fourth stages 14,28 are mounted on the second shaft 24. As before, each shaft 23,24 is driven by a high speed direct drive motor 15,16 and the motors 15,16 are controlled by one or more drives 25.

The invention claimed is:

1. A multi-stage compression system comprising at least four centrifugal compression stages, each including an impeller, one pair of the stages are mounted on a first shaft coupled to a first high speed direct drive motor, and another pair of the stages are mounted on a second shaft coupled to a second high speed direct drive motor, the speed of the first and second motors being controlled by at least one drive such that the impellers are all driven at the same speed, wherein one compression stage on the first shaft and another compression stage on the second shaft form a pair of first compression stages, said pair of first compression stages are mounted in parallel to each other; the other compression stages are a second and third compression stage; neither the second nor third compression stage is upstream of either of the compression stages of the pair of first compression stages; the second and third compression stage are mounted in series with each other, with the third stage downstream of the second stage, and the second and third compression stages are downstream of both the compression stages of the pair of first compression stages.

2. A multi-stage compression system as claimed in claim 1 in which the impeller of one compression stage of the pair of first compression stages and the impeller of the second compression stage are mounted on the first shaft and the impeller of the other compression stage of the pair of first compression stages and the impeller of the third compression stage are mounted on the second shaft.

3. A multi-stage compression system as claimed in claim 1 in which a first intercooler is connected to a fluid outlet of each of the first compression stages and said first intercooler is connected to a fluid inlet of the second compression stage.

4. A multi-stage compression system as claimed in claim 3 in which a second intercooler is connected to a fluid outlet of the second compression stage and a fluid inlet of the third compression stage.

5. A multi-stage compression system as claimed in claim 1 in which the motors are controlled by at least one variable frequency drive.

6. A multi-stage compression system as claimed in claim 1 in which the impellers of the compression stages of the pair of first compression stages have a first diameter, the impeller of the second compression stage has a second diameter, and the impeller of the third compression stage has a third diameter, the first, second and third diameters are all different from each other.

7. A multi-stage compression system as claimed in claim 1 in which the compression stages of the pair of first compression stages have a first specific speed, the second compression stage has a second specific speed, and the third compression stage has a third specific speed, the first, second and third specific speeds are all different from each other.

* * * * *